(12) United States Patent
Palivela et al.

(10) Patent No.: US 11,301,253 B2
(45) Date of Patent: Apr. 12, 2022

(54) BRANCH PREDICTION STRUCTURE INDEXED BASED ON RETURN ADDRESS POPPED FROM A CALL-RETURN STACK

(71) Applicant: Arm Limited, Cambridge (GB)

(72) Inventors: Varun Palivela, Chandler, AZ (US); Tom Marko Hameenanttila, Phoenix, AZ (US)

(73) Assignee: Arm Limited, Cambridge (GB)

( * ) Notice: Subject to any disclaimer, the term of this patent is extended or adjusted under 35 U.S.C. 154(b) by 240 days.

(21) Appl. No.: 16/100,448

(22) Filed: Aug. 10, 2018

(65) Prior Publication Data

US 2020/0050459 A1 Feb. 13, 2020

(51) Int. Cl.
*G06F 9/38* (2018.01)
*G06F 9/30* (2018.01)
*G06F 11/34* (2006.01)
*G06F 9/32* (2018.01)

(52) U.S. Cl.
CPC ........ *G06F 9/3848* (2013.01); *G06F 9/30058* (2013.01); *G06F 9/324* (2013.01); *G06F 9/3806* (2013.01); *G06F 9/3808* (2013.01); *G06F 11/3466* (2013.01)

(58) Field of Classification Search
CPC .............................. G06F 9/3806; G06F 9/3844
See application file for complete search history.

(56) References Cited

U.S. PATENT DOCUMENTS

| | | | | |
|---|---|---|---|---|
| 5,964,870 A | * | 10/1999 | Malizewski | G06F 9/3806 712/238 |
| 9,189,365 B2 | * | 11/2015 | Frazier | G06F 11/348 |
| 2007/0106888 A1 | * | 5/2007 | Chaudhry | G06F 9/3867 712/242 |
| 2008/0301420 A1 | * | 12/2008 | Inoue | G06F 9/30058 712/240 |
| 2014/0143522 A1 | * | 5/2014 | Saidi | G06F 12/0862 712/207 |
| 2015/0121050 A1 | * | 4/2015 | Williams | G06F 9/30058 712/238 |

OTHER PUBLICATIONS

D.A. Jimenez, "Multiperspective Perceptron Predictor", *The Journal of Instruction-Level Parallelism*, 2016, pp. 1-5.

(Continued)

*Primary Examiner* — Jacob Petranek
(74) *Attorney, Agent, or Firm* — Nixon & Vanderhye P.C.

(57) ABSTRACT

An apparatus comprises a branch predictor to predict an outcome of a branch instruction to be processed by processing circuitry, based on branch prediction state information stored in one or more branch prediction structures, and a call path tracking element to store call path tracking information, where in response to a procedure calling instruction processed by the processing circuitry, the call path tracking information is updated depending on at least a portion of an address associated with the procedure calling instruction. The one or more branch prediction structures include at least one call-path-indexed branch prediction structure which is indexed based on an index value which depends on a portion of the call path tracking information stored in the call path tracking element.

11 Claims, 6 Drawing Sheets

(56) References Cited

OTHER PUBLICATIONS

D.A. Jimenez, "Fast Path-Based Neural Branch Prediction", *Proceedings of the 36th International Symposium on Microarchitecture (MICRO-36 2003)*, Dec. 5, 2003, 10 pages.

L. Porter et al, "Creating Artificial Global History to Improve Branch Prediction Accuracy" *ICS'09*, Jun. 8-12, 2009, 10 pages.

Y. Ninomiya et al., "Path Traced Perceptron Branch Predictor Using Local History for Weight Selection", *Department of Computer Science, The University of Electro-Communications*, 2007, 6 pages.

D. Gope et al., "Bias-Free Branch Predictor", *2014 47th Annual IEEE/ACM International Symposium on Microarchitecture*, Dec. 13-17, 2014, 12 pages.

\* cited by examiner

BRANCH PREDICTION STRUCTURE INDEXED BASED ON RETURN ADDRESS POPPED FROM A CALL-RETURN STACK

BACKGROUND

Technical Field

The present technique relates to the field of data processing. More particularly, it relates to branch prediction.

Technical Background

A data processing apparatus may have branch prediction circuitry for predicting outcomes of branch instructions before they are actually executed. By predicting branch outcomes before the branch instruction is actually executed, subsequent instructions following the branch can start to be fetched and speculatively executed before execution of the branch instruction is complete, so that if the prediction is correct then performance is saved because the subsequent instructions can be executed sooner than if they were only fetched once the outcome of the branch is actually known.

SUMMARY

At least some examples provide an apparatus comprising: processing circuitry to perform data processing in response to instructions; a branch predictor to predict an outcome of a branch instruction to be processed by the processing circuitry, based on branch prediction state information stored in one or more branch prediction structures; and a call path tracking element to store call path tracking information, where in response to a procedure calling instruction processed by the processing circuitry, the call path tracking element is configured to update the call path tracking information depending on at least a portion of an address associated with the procedure calling instruction; in which: said one or more branch prediction structures include at least one call-path-indexed branch prediction structure indexed based on an index value which depends on a portion of the call path tracking information stored in the call path tracking element.

At least some examples provide an apparatus comprising: means for performing data processing in response to instructions; means for predicting an outcome of a branch instruction to be processed by the processing circuitry, based on branch prediction state information stored in one or more branch prediction structures; and means for storing call path tracking information, where in response to a procedure calling instruction processed by the means for performing data processing, the means for storing is configured to update the call path tracking information depending on at least a portion of an address associated with the procedure calling instruction; in which: said one or more branch prediction structures include at least one call-path-indexed branch prediction structure indexed based on an index value which depends on a portion of the call path tracking information stored in the means for storing.

At least some examples provide a method comprising: performing data processing in response to instructions; in response to processing of a procedure calling instruction, updating call path tracking information stored in a call path tracking element depending on at least a portion of an address associated with the procedure calling instruction; and predicting an outcome of a branch instruction to be processed by the processing circuitry, based on branch prediction state information stored in one or more branch prediction structures; said one or more branch prediction structures including at least one call-path-indexed branch prediction structure which is indexed based on an index value which depends on a portion of the call path tracking information stored in the call path tracking element.

Further aspects, features and advantages of the present technique will be apparent from the following description of examples, which is to be read in conjunction with the accompanying drawings.

DESCRIPTION OF EXAMPLES

Figure 1:
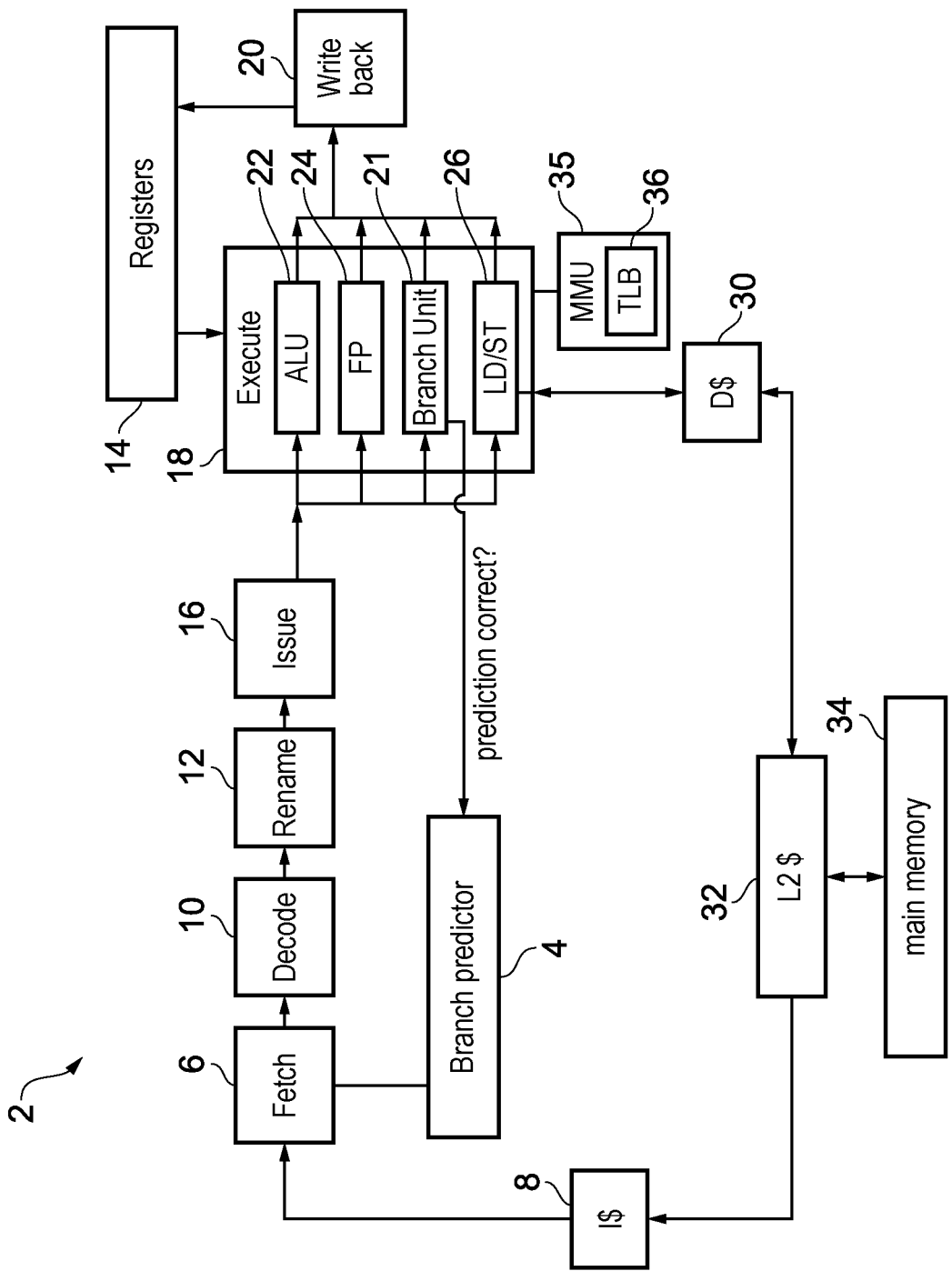
FIG. 1 schematically illustrates an example of data processing apparatus having a branch predictor.

An apparatus has processing circuitry to perform data processing in response to instructions, and a branch predictor to predict an outcome of a branch instruction to be processed by the processing circuitry based on branch prediction state information stored in one or more branch prediction structures. A call path tracking element is provided to store call path tracking information. In response to a procedure calling instruction processed by the processing circuitry, the call path tracking element updates the call path tracking information depending on at least a portion of an address associated with the procedure calling instruction. The one or more branch prediction structures of the branch predictor include at least one call-path-indexed branch prediction structure which is indexed based on an index value which depends on a portion of the call path tracking information stored in the call path tracking element. By using the call path tracking information to determine the index value used to select branch prediction state information from the call-path-indexed branch prediction structure, prediction accuracy can be improved since branch instructions which are called from different places in the program being executed, which would otherwise alias onto the same entry of the branch prediction structure can be distinguished using the call path tracking information. When tested on relatively hard to predict processing benchmarks, the use of the call path tracking information to derive the index value for at least one call-path-indexed branch prediction structure has been shown to provide an improvement in branch prediction performance.

The address associated with the procedure calling instruction, which is used to update the call path tracking information when a procedure calling instruction is executed, could be any address which corresponds to the procedure calling instruction in some way. In some cases this address could be the instruction address of the procedure calling instruction itself, which may be used as an indication of the location in the code from which a certain procedure is called.

However, in some examples the address associated with the procedure calling instruction may comprise a return address identifying an instruction to be executed after returning from a procedure called by the procedure calling instruction. For example the return address may be the address of the instruction following the procedure calling instruction (the instruction whose address comes next sequentially within the address space).

The procedure calling instruction may be any instruction which may be used to call procedures or functions. A procedure or function may comprise a sequence of instructions which can be called from multiple locations within the program code being executed. In some cases the procedure calling instruction may include a particular class of one or more predetermined types of branch instruction. For example, the procedure calling instruction may be a branch-with-link instruction which triggers the processing circuitry, in addition to the branch to the program instruction address associated with the procedure code, to also cause a return address to be stored to a link register or another storage location so that a subsequent return branch can then cause program flow to return to the instruction following the procedure calling instruction once the procedure has finished executing.

It is not essential for all procedure calling instructions to trigger an update to the call path tracking information stored by the call path tracking element. In some implementations, only a subset of types of procedure calling instruction could trigger an update to the call path tracking information, or other properties of the procedure calling instruction such as the address of the procedure calling instruction or the address of the procedure called by the procedure calling instruction could be used to determine whether an update to the call path tracking information is needed. For example the call path could be tracked only in some parts of the program and not in others.

The call path tracking element may comprise any kind of storage circuitry which can be used to store the call path tracking information. In one example, the call path tracking element could comprise a register which stores a value which is updated depending on addresses associated with procedure calls, to depend on the particular sequence of procedure calls that has been made to reach the current point of execution. For example, the register could, on each procedure calling instruction, be hashed with the address associated with the procedure calling instruction, to give a call path hash value which depends on each previously called procedure which has not yet been completed. On a return from execution of a given procedure or function, a reverse hash could be applied based on the return address, to reverse the change made when calling that procedure, so that the contents of the register may have a consistent value within a given level of procedure call (being the same both before and after a further nested procedure call has been made from an earlier procedure). Such a call path hash value may represent the location within the code, and so can be used to derive the index for a branch prediction structure to improve prediction accuracy.

However, in some examples the call path tracking element may comprise a last-in, first-out (LIFO) data structure. The LIFO structure enables call path tracking information to be removed from the LIFO in the reverse order to which they were added, which can be useful for tracking nested procedure calls and returns. By using call path information from a LIFO structure for generating the index for a branch prediction structure, this can improve branch prediction accuracy.

In one example the call path tracking element may comprise a call-return stack which comprises at least one entry to store a return address pushed onto the call-return stack in response to a corresponding procedure calling instruction. For example, some branch predictors may maintain such a call-return stack for the purpose of predicting the return instruction before the actual return address is known. Note that this call-return stack may be separate from the link register used to generate the actual return address when the return address is actually executed and may also be separate from any stack data structure maintained by software in main memory which can be used to preserve the contents of a link register when it needs to be overwritten on a subsequent function call. The call-return stack may be a microarchitectural structure which need not be provided to comply with an instruction set architecture supported by the processing circuitry, but may be included for performance reasons to enable fetching of instructions following a return instruction to commence before the actual return address is known. In response to a procedure calling instruction, the return address of the corresponding procedure call (e.g. the instruction of the next sequential instruction following the procedure calling instruction) may be pushed on to the call-return stack. When the branch predictor identifies that a return instruction is to be executed then the return address of the return instruction can be predicted based on the return address popped from the call-return stack. Information from the call-return stack can be used to generate the index value for indexing into the call-path-indexed branch prediction structure, to improve branch prediction performance with relatively little additional circuit area overhead compared to typical branch predictors.

Note that while the call-return stack in typical branch predictors may generally be used to predict the return address of return instructions only (where those return instructions are intended for returning processing from a previously called function or procedure to the processing that was being performed before that function or procedure was called), in the technique discussed above the at least one call-path-indexed branch prediction structure may store branch prediction state information for predicting outcomes of one or more types of branch instructions which include at least one branch instruction type other than the return instruction. Hence, rather than using the call-return stack only for predicting the target addresses of return instructions, information from the call-return stack can also be used for predicting outcomes of other types of branch instructions. These outcomes can include the branch direction (whether a branch should be predicted taken or not taken), or could include the branch target address of a branch instruction (the address to be executed following the branch if the branch is taken).

Where the call-return stack is used to generate the index value for the call-path-indexed branch prediction structure, this index value could be derived from different portions of the call path tracking information on the call-return stack. For example, the index value may depend on a result of applying a hash function to at least a portion of one or more return addresses in one or more of the at least one entry of the call-return stack.

In one example, the portion of the call path tracking information used may comprise the return address at the top of the call-return stack (e.g. the return address that was most recently pushed onto the call-return stack). Hence, if the call-return stack includes more than one active entry storing a return address still to be popped from the call-return stack, only the return address at the top of the stack could be considered, and any less recently pushed return addresses could be ignored for the purpose of generating the index to the call-path-indexed branch prediction structure. This approach can be simpler to implement as it requires less processing logic.

Alternatively, when the call-return stack includes multiple active entries storing return addresses which are still to be popped from the call-return stack, the index value for the call-path-indexed branch prediction structure could be derived from the return addresses in at least two of those active entries, e.g. the at least two most recently pushed entries on the call-return stack. By considering additional entries as well as the most recently pushed entry at the top of the call-return stack, this can improve performance as it allows the location from which a procedure was called to be distinguished more precisely and so reduces the chance of branches with different behaviour being aliased onto the same entry of the call-path-indexed branch prediction structure. For example, when multiple active entries of the call-return stack are considered, the index value could depend on a result of applying a hash function to the return addresses (or to portions of return addresses) in the at least two active entries.

It is not essential to consider the entire call path tracking information for deriving the index for the call-path-indexed branch prediction structure. In some cases, circuit overhead could be reduced by using a proper subset of bits of each return address for the purpose of generating the index into the call-path-indexed branch prediction structure.

In some cases the index value for a certain branch prediction structure could depend solely on the call path tracking information. However, branches can be distinguished more precisely if the index value depends on a function of both the portion of the call path tracking information and at least one type of further information. This further information could include any one or more of a program counter; at least a portion of a global history value indicative of a history of taken or not taken outcomes for a plurality of previous branch instructions; and at least a portion of a path value indicative of a history of branch target addresses determined for a plurality of previous branch instructions.

In response to the procedure calling instruction, the call path tracking information may be updated based on a portion of the address associated with the procedure calling instruction. That portion could include the entire address, or could be a proper subset of the bits of the address. In some cases, the call path tracking element could be updated not only based on the portion of the address associated with the procedure calling instruction, but also on other information. For example, at least one context identifier (or a portion of the context identifier) which indicates an execution context in which the procedure calling instruction is executed could be used to update the call path tracking information, so that branches with the same procedure call address or return address executed in different execution contexts can be distinguished from each other.

The call-path-indexed branch prediction structure may not be the only branch prediction structure of the branch predictor. There could also be at least one further branch prediction structure index based on an index value calculated independently from any portion of the call path tracking information. It is not essential to use the call path tracking information to derive the index for all of the branch prediction structures provided. Even if the call path tracking information is only used for some of the branch prediction structures, this can still provide an appreciable performance improvement.

Although call path information could be used for any branch prediction structure which predicts any outcome of a branch instruction, it can be particularly useful for a conditional branch direction predictor which predicts whether a conditional branch instruction should be taken based on branch prediction state stored in a plurality of tables.

FIG. 1 schematically illustrates an example of a data processing apparatus 2 having a processing pipeline comprising a number of pipeline stages. The pipeline includes a branch predictor 4 for predicting outcomes of branch instructions. A fetch stage 6 generates a series of fetch addresses based on the predictions made by the branch predictor 4. The fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. Access to memory may be controlled using a memory management unit (MMU) 35 for controlling address translation and/or memory protection. The load/store unit 26 may use a translation lookaside buffer (TLB) 36 of the MMU 35 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Computer programs across different architectures utilize Branch instructions to jump between different regions of code. For example, branch conditional [B.COND] instructions may jump conditionally, Branch Link [BL] instructions may call a subroutine while saving the return address, and unconditional branch [B] instructions may jump unconditionally. High-performance microprocessors have dynamic branch predictor structures that predict whether the B.COND was true [Taken] or false [Not Taken] and/or the target address of the different branches. Correct predictions result in improved instruction throughput and lower energy consumption for a given program.

Figure 2:
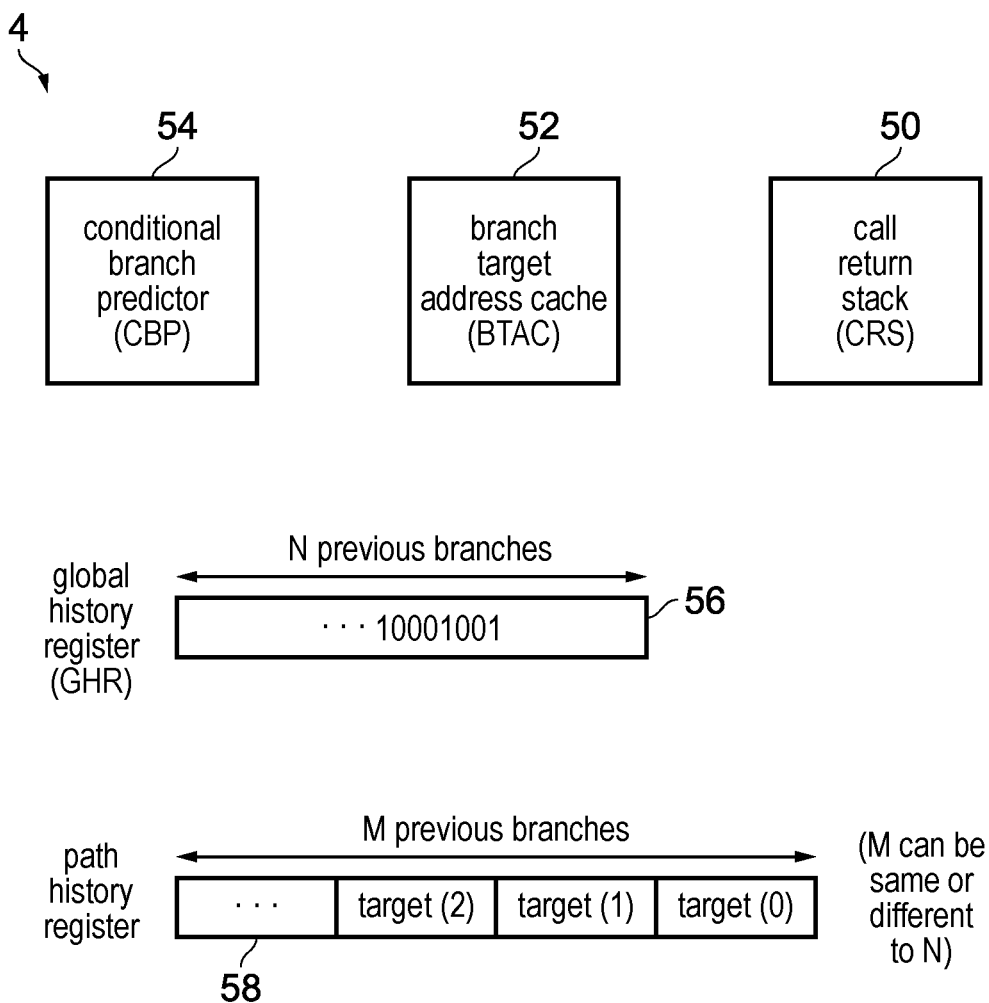
FIG. 2 shows examples of components of the branch predictor.

Computer programs are comprised of various functions or subroutines and BL instructions are used to branch to a specific subroutine and also save the return address. As shown in FIG. 2, to boost performance of BL instructions, a Last-In First-Out [LIFO] structure called a call-return stack [CRS] 50 may be provided. Return addresses are pushed to the CRS 50 on a BL instruction, and popped from the CRS 50 when returning from a subroutine on a Return [RET] instruction. The popped return address is used as a prediction of the actual return address of the RET instruction when the RET instruction is executed. The CRS can also be referred to as the hardware call-stack.

It is typical to have multiple predictor structures in high-performance microprocessors to improve efficiency of executing branch instructions at various stages in the pipeline. As shown in FIG. 2, in addition to the CRS 50, the branch predictor 4 may include a Branch Target Address Cache 52 [BTAC] to store the target address of a branch, and a Conditional Branch Predictor [CBP] to predict whether a branch instruction is Taken or Not-Taken. It is important to note that these are speculative structures since they have limited entries to reduce area impact and so cannot accurately track every branch in a given program. Hence, branch predictions may sometimes be incorrect. The branch prediction state stored in the various structures 50, 52, 54 is updated in response to the actual branch outcomes evaluated by the branch unit 21 in the execute stage 18, so that the branch predictor 4 can learn from past behaviour to increase the probability of correct predictions in future. If a misprediction is detected, the processing pipeline may restore previously captured architectural state to its registers 14 (either by writing state previously stored to memory back to the registers 14, or by changing the register mapping between architectural registers and physical registers provided by the rename stage 12 so that physical registers which hold a previous snapshot of architectural state are now mapped to the architectural registers). The pipeline then resumes processing from an earlier point of execution corresponding to the restored architectural state.

Processing performance for a given program may depend on the prediction success rate. Micro-architects design predictors to dynamically use program run-time information to improve prediction rate for different Branch instructions. For example, a Global History Register [GHR] 56 may be used to track Taken/Not-Taken results of the past N branches. Another source of information is the Path history [P] 58 which stores the target address of the past M branches (M can be the same as N or different to N). The information from the GHR 56 and Path history register 58 can be used to generate an index for selecting which entry of branch prediction state to use for a prediction when accessing structures such as the BTAC 52 or CBP 54. However, as discussed in more detail below, these forms of information may not completely represent program run-time behaviour.

Figure 3:
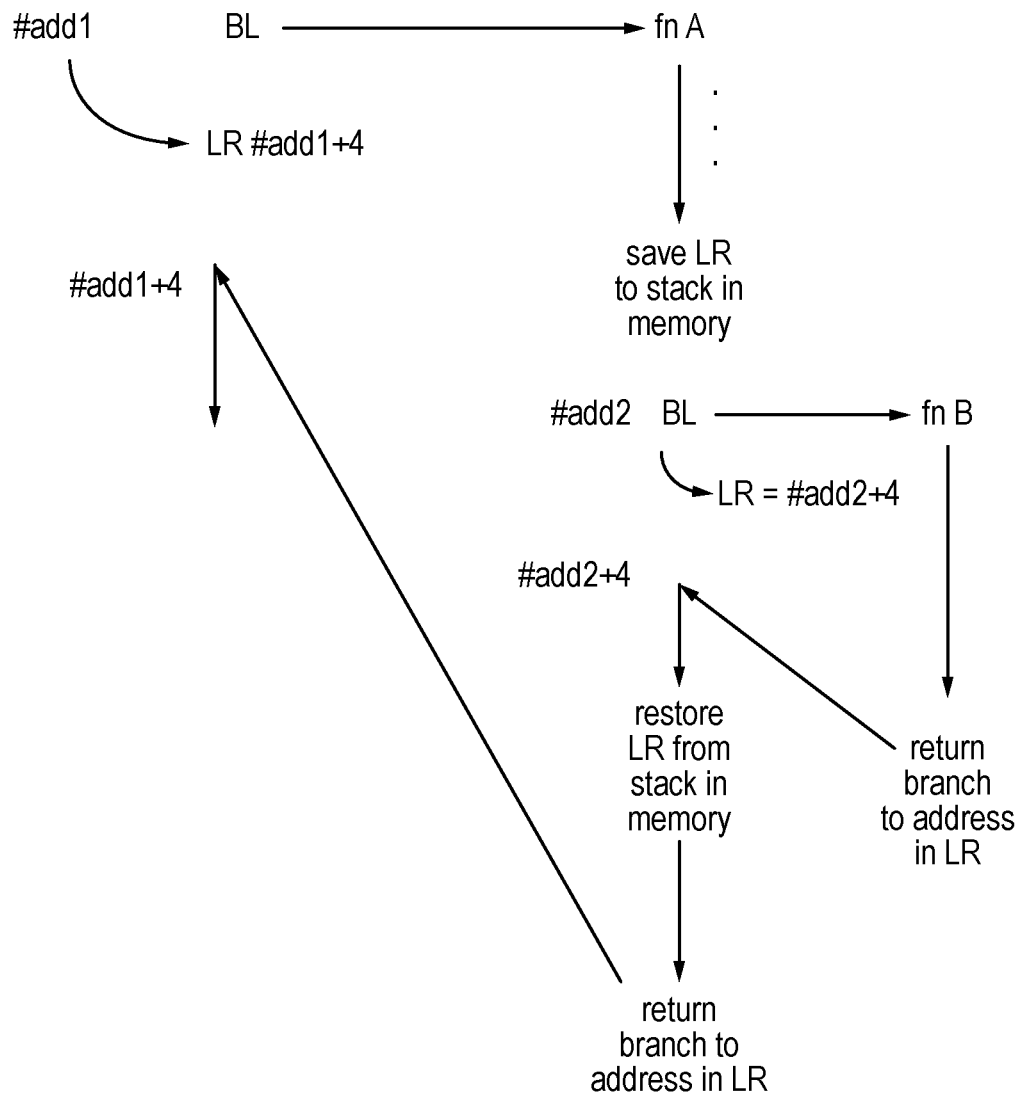
FIG. 3 shows an example of nested procedure calls.

FIG. 3 shows an example of a nested set of procedure calls. A branch with link (BL) instruction at an address #add1 calls a certain procedure (function A). In response to the BL instruction at address #add1 the processing element stores the return address of function A to the link register within the register file 14. The return address is the address of the next sequential instruction after the BL instruction, e.g. address #add1+4. In response to the BL instruction the program flow branches to the address of an instruction at the start of the code corresponding to function A, and then execution continues sequentially within that function. Within function A, a further function (function B) is called by a BL instruction at address #add2. As the BL instruction would overwrite the previous contents of the link register (LR), the value in the link register which provides the return address for function A is saved to a stack data structure within the memory system 30, 32, 34 before executing the second BL instruction at address #add2. Note that this stack in the memory system is not the same as the call return stack 50, but is a stack data structure allocated by software in memory. Hence, in response to the second BL instruction at address #add2, the return address of function B (#add2+4) is saved to the link register and then program flow branches to the program code corresponding to function B. Once the function B completes, a return branch is executed which triggers the branch unit 21 to read the return address previously saved to the link register and cause program flow to branch to the instruction at the return address #add2+4. The remaining part of the code in function A then restores the previous contents of the link register (i.e. return address #add1+4) from the stack in memory to the link register in the register file 14 and then flow continues within function A until a second return branch is reached which then triggers the branch back to the instruction at address #add1+4.

Figure 4:
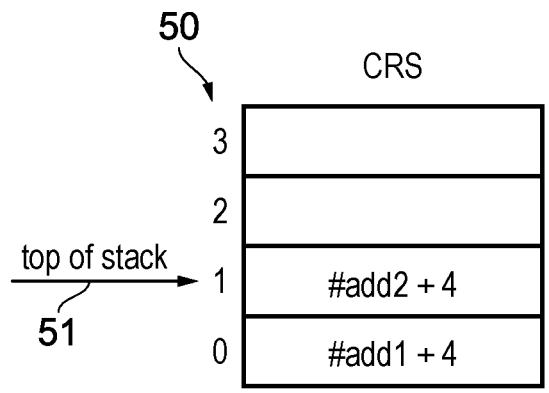
FIG. 4 shows an example of tracking return addresses of procedure calls on a call-return stack.

FIG. 4 shows an example of the call return stack 50 updated with the addresses of the respective function calls. FIG. 4 shows the state of the call return stack 50 at the point when the processing is within function B in the example of FIG. 3. The call return stack (CRS) may be a last in first out (LIFO) structure, which can be maintained as a circular buffer for example with a pointer 51 indicating the entry corresponding to the top of the stack. The top of the stack is the most recently allocated entry on the stack (and also the entry which will be popped from the stack the next time a return branch is encountered by the fetch stage 6). The branch predictor 4 uses the call return stack to predict the return address of a return instruction before it is actually known.

Figure 5:
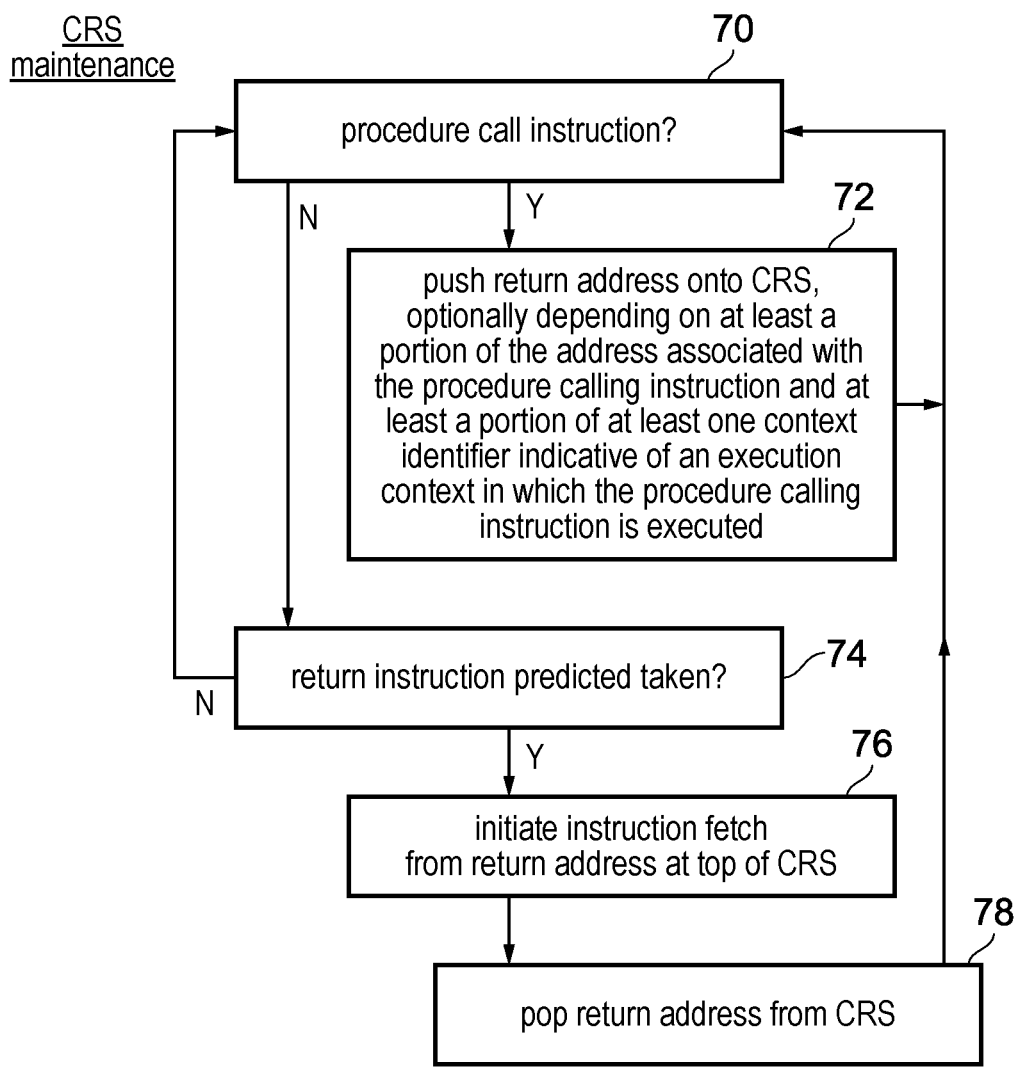
FIG. 5 is a flow diagram showing a method of maintaining the information on the call-return stack.

FIG. 5 shows an example of a method for maintaining the address on the call return stack 50. At step 70, at least one of the fetch stage 6 the decode stage 10 and the branch predictor 4 identifies whether the next instruction fetched by the fetch stage 6 is a procedure calling instruction (e.g. a BL instruction). If so then at step 72 the address of the next sequential instruction following the procedure calling instruction is pushed as a return address onto the call return stack 50, and the pointer 51 is updated to indicate that the entry used to store that return address is now at the top of the stack. The method then returns to step 70 to consider the next instruction.

If the instruction identified at step 70 is not a procedure calling instruction then at step 74 it is determined whether that instruction is a return instruction that is predicted to be taken. If not then again the method loops back to step 70 to consider the next instruction. However if the next fetched instruction is a return instruction which is predicted to be taken by the branch predictor, then at step 76 the branch predictor predicts that the return address of the return instruction will be the address currently stored in the entry of the CRS 50 which represents the top of the stack as indicated by pointer 51. The fetch stage 6 initiates instruction fetching from the instruction having the predicted return address. At step 78, the return address is popped from the CRS 50, and the pointer 51 is updated so that now the top of the stack becomes the entry which contains the next most recently pushed return address.

The CRS 50 may have a finite number of entries, and so when the CRS becomes full it may not be possible to push further return addresses onto the CRS. In this case, the prediction of the return address for some return instructions could be incorrect. Such mispredictions may be handled in the same way as recovering from other types of branch misprediction (e.g. by restoring previous processor state and resuming processing of instructions from an earlier point of the program).

The inventor recognised that program run-time behaviour can be better represented and branch prediction accuracy improved by using information present in the hardware call-stack (CRS) 50, or other forms of call path tracking information. This call path information can augment information already captured in GHR 56 and Path register 58, and works better because of two key observations:

1 Many programs have subroutines or helper functions which are executed several times from different places and phases during run-time. In these cases, history can get complicated enough that GHR, P cannot accurately predict behaviour of the current Branch instruction. However, since calls to a helper function are made from a different place in the program distinguished by the address at the top of the CRS, the CRS can be used to correctly predict the behaviour of the branch instruction.

2 Given the limited number of entries in the branch predictor structures, it is possible for multiple branches to alias to the same entry and if their behaviour is not complementary then we end up having destructive aliasing and we get incorrect predictions. However, when these branch instructions aliased to the same entry are called from different places in the program, the CRS can be used to eliminate the destructive aliasing thereby improving prediction accuracy.

The CRS information can be used in any aspect of the branch predictor design and in several different ways. Any known prediction algorithm may use the CRS information. For example, known algorithms may already use hashing and/or concatenation of different forms of branch information to generate inputs to prediction logic, making it easy to add CRS-based influence to a tunable degree. We show some example implementations below. For example, a hashed-perceptron predictor, which comprises multiple tables which use combinations of GHR and P histories hashed with current PC (program counter) to index into the predictor tables, was modified to also consider CRS information by modifying one of these tables to use a hash of CRS information [specifically, the entry at the top of stack] and current PC. We observed a 8% improvement in the Crafty component of SPEC CPU 2000 benchmark, which is a hard to predict program for branch predictors. Overall, the SPEC INT 2000 score improves by 0.3% which is significant given that this is the simplest implementation of the invention, requiring very little in the way of additional logic area or timing pressure. It would be expected that other implementations may provide further performance improvement. For example, alternate implementations may include hashing all/partial contents of the CRS while reducing information loss to better represent the current program location. We can do this by only taking the top N most relevant entries of the CRS, or by weighting entries differently before applying the hash function, or any other combination. By considering multiple entries of the CRS this can better identify the point in the code, e.g. in the example of FIG. 3 this can enable a branch in function B executed when function A is called from one part of the code to be distinguished from the branch in function B when function A is called from another part of the code. The search space is large and the final implementation choice may depend on the application domain.

Figure 6:
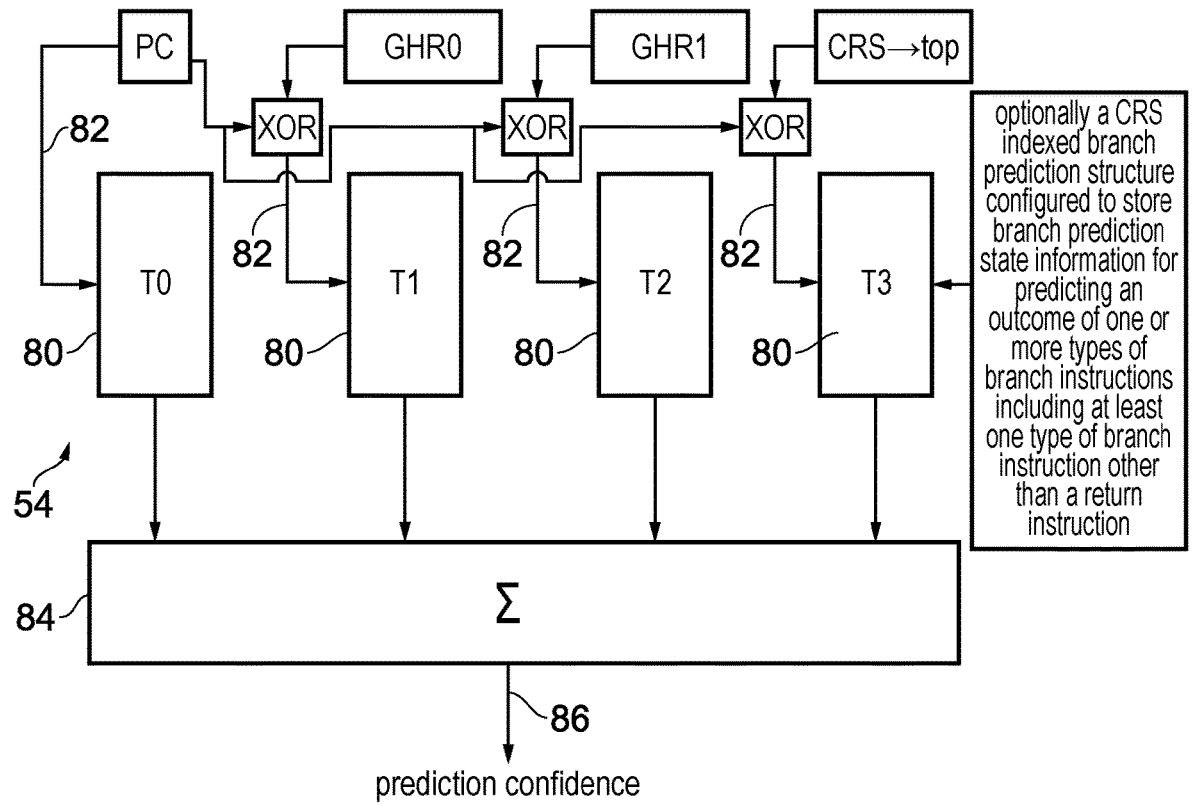
FIG. 6 shows a first example of a branch predictor including at least one call-path-indexed branch prediction structure.

FIG. 6 shows a first example of using information from the CRS to derive an index for at least one branch prediction structure. FIG. 6 shows an example of the conditional branch predictor 54 which in this example is implemented as a perceptron predictor which comprises a number of weight tables 80 which each include a number of predictions entries with each entry storing a weight value. The index value 82 used to select an entry from a given weight table for making the prediction for a given branch instruction is derived from various information associated with the branch. Three of the tables 80 (T0, T1, T2) shown in the example of FIG. 6 are indexed with an index value 82 which is independent of the information on the call return stack 50. For example, table T0 is indexed based on the program counter which represents the address of the instruction being predicted, table 1 is indexed based on a first portion GHR0 of the global history register 56 hashed (XORed in this example) with the program counter, and table T2 is indexed based on a second portion GHR1 of the global history register 56 hashed with the program counter. Table T3 is a call-path-indexed branch prediction structure, as its index 82 is generated by hashing the program counter with the address in the entry at the top of the call return stack 50 (indicated by the pointer 51). In some examples, the index 82 for table T3 can be derived only from part of the address in the entry at the top of the stack, so it is not essential to consider the entire address.

The indexed entries in each of the tables T0 to T3 are added together by an adder 84 to generate an output value 86 which represents a prediction confidence. The prediction confidence can be compared with a predefined threshold and if the confidence is one side of the threshold then the branch predictor may be taken and if the confidence is the other side of the threshold then the branch can be predicted not taken (when the confidence equals the threshold the prediction could be either taken or not taken). The respective weights in the tables T0 to T3 can be updated based on the actual outcomes determined at the execute stage 18.

Hence, by using the entry at the top of the call return stack 50 to generate an index for at least one of the weight tables of the perceptron, this can improve prediction performance. While FIG. 6 shows only one of the tables being indexed with an index value depending on the call path tracking information in the CRS, in other examples the CRS information could be used for multiple tables. For example, the index values 82 for all of the tables could be derived from the CRS by additionally hashing the CRS with the other information used to derive that index.

Figure 7:
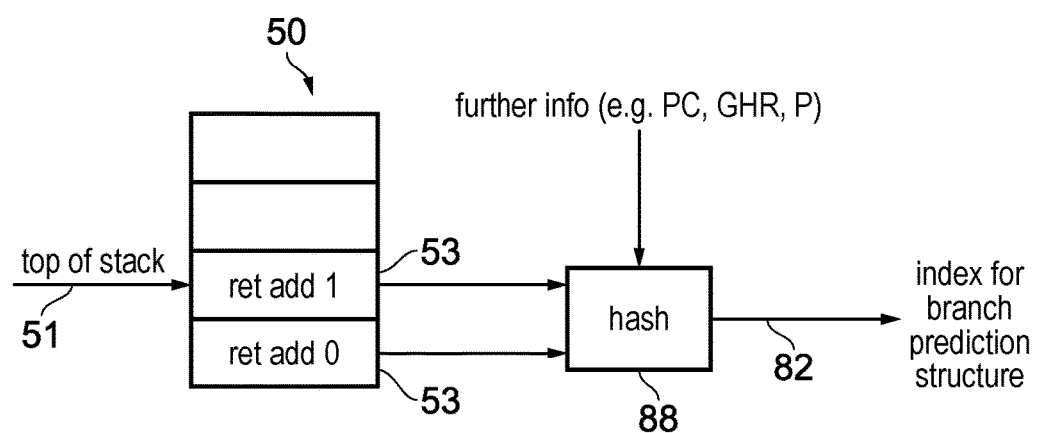
FIG. 7 shows an alternative example where the index for the call-path-indexed branch prediction structure is derived from multiple entries of the call-return stack.

In the example of FIG. 6, only the entry at the top of the CRS is considered for generating the index to table T3. However, in other examples multiple entries of the CRS 50 may be used to derive the index 82 for a certain branch prediction structure. For example FIG. 7 shows an example where a hash function 88 is applied to at least a portion of bits of each of the addresses in two or more different entries 53 of the call return stack 50. Optionally the hash may also consider other information such as the program counter, a portion of the GHR 56 or a portion of the path register 58. The result of the hash function 88 is used as an index for a branch prediction structure.

Figure 8:
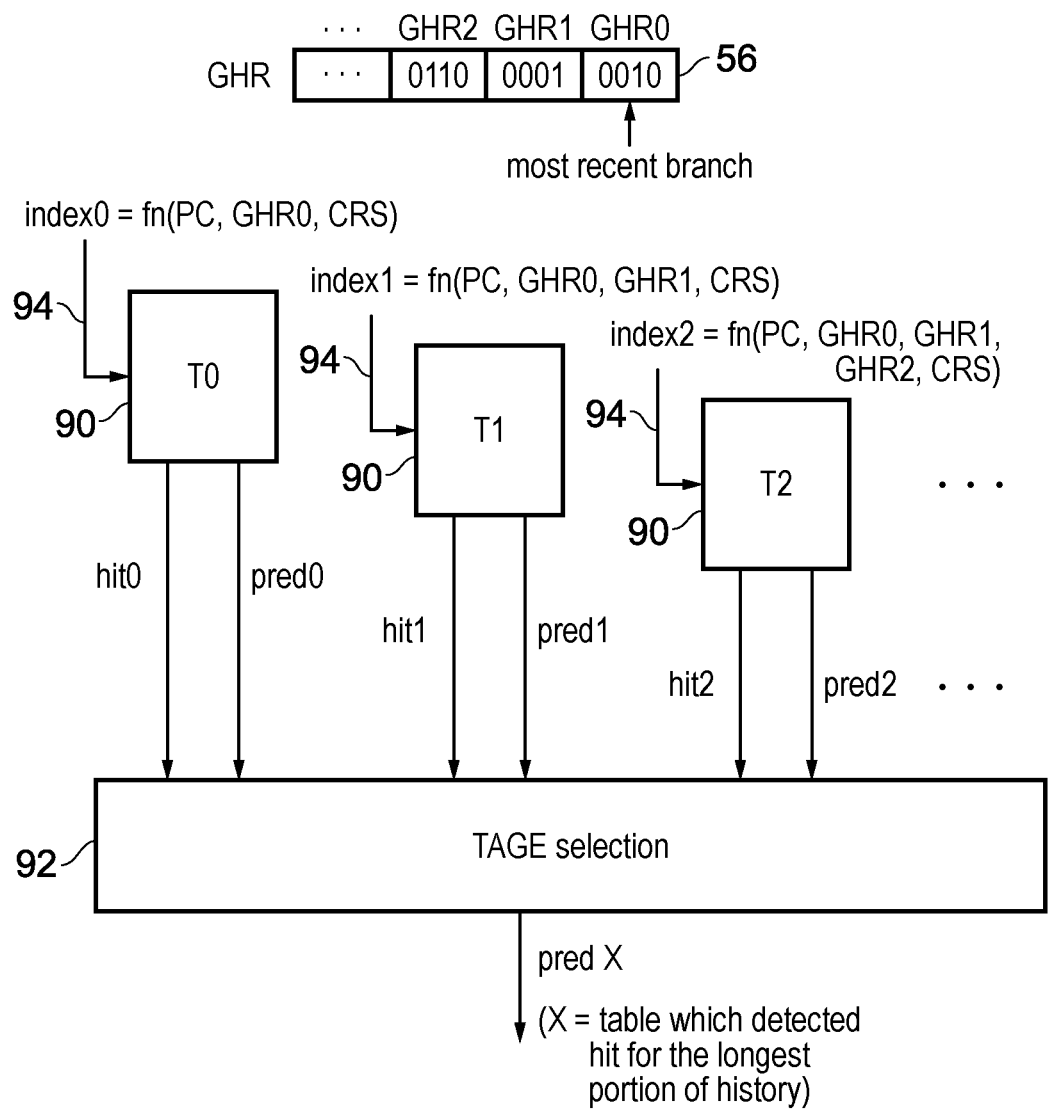
FIG. 8 shows another example of a branch predictor including at least one call-path-indexed branch prediction structure.

The perceptron shown in FIG. 6 is just one example of a possible branch prediction algorithm which could benefit from use of the call path tracking information to derive an index into a branch prediction table. FIG. 8 shows another example based on a TAGE branch predictor. A TAGE branch predictor includes a number of prediction tables 90 which are each indexed based on a different length portion of the global history information stored in the GHR 56. For example in FIG. 8 table T0 is indexed as a function of the program counter and a portion GHR 0 of the GHR 56, table T1 is indexed based on a function of the program counter, and portions GHR0, GHR 1 of the GHR 56, and table T2 is indexed as a function of the program counter and portions GHR 0, GHR 1, GHR 2 of the GHR 56, and so on for other tables. Hence, each table is indexed based on a different length portion of the branch history. A selector 92 may be provided to select one of the predictions made by the TAGE tables 90, selecting, from among the predictions for which a hit was returned, the prediction which was based on an index corresponding to the longest history portion of the GHR.

The TAGE approach can be useful to improve performance since generally if the branch history associated with the current branch matches against an entry derived from a longer sequence of branch history, then it is more likely that prediction will be correct than if it matches against an entry which only is associated with a shorter sequence of branch history, as it is less likely that different branches will map to the same branch history when a longer sequence of branch history is considered. However, as there could be more variation in the branch history over a longer sequence, the hit rate is often lower in a table indexed based on a longer sequence of branch history. Hence by including multiple tables indexed with shorter and longer sequences of branch history, this can balance hit rate versus prediction accuracy when there is a hit. When there is a hit for a longer sequence, that prediction is selected, but if there is no matching entry in a table associated with the longer sequence then a prediction can still be made based on a table indexed with a shorter sequence of branch history.

The information from the CRS 50, which could be either an address (or partial address) from the top of the stack as in FIG. 6, or a function of portions of multiple addresses as in FIG. 7, can be considered for generating the index values 94 for any one or more of the TAGE tables 90. In the example of FIG. 8, the CRS information is hashed together with the program counter and the variable length portions of the GHR, for each of the tables T0 to T2.

It will be appreciated that perceptron and TAGE are just two potential branch prediction types which could be supplemented with the call return stack information for generating an index value to at least one branch prediction structure. Any other branch prediction algorithm could use the call path tracking information to derive an index to a branch prediction structure. For example other branch prediction techniques like 2bc-gskew could similarly use the call return stack information.

Also, while the examples above use a stack (last in first out) data structure to preserve the return addresses of function calls as call path tracking information, other forms of call path tracking information could also be used to derive index values for branch prediction structures. The call path tracking information could exist in any form, whether as a collection of addresses or an amalgamation of addresses, or some tracking value which does not allow individual addresses to be distinguished but which nevertheless depends on the particular sequence of function calls made to the point of execution associated with a given branch instruction to be determined.

For example, a register could be permuted on each function call based on the return address of the function, e.g. by XORing the previous contents of the value stored in the register with the latest return address. An inverse hash may then be applied when returning from a function, based on the return address of that function. For example another XOR operation may reverse the XOR operation previously applied when the function was called. In this way the hash value may depend on the sequence taken to reach the current point of execution and may have different values when the same function is called from different locations of the program, but need not explicitly identify the respective return addresses associated with each function call made to reach the current point of execution. The hash value in the register (or a portion of that value) could be used instead of the call return stack information in the examples above, to generate the index to at least one branch prediction structure. Hence in general any type of call path tracking information which depends on the sequence of procedure calls taken to reach the current location in the program may be used to derive the index for a call-path-indexed branch prediction structure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to instructions;
a branch predictor to predict an outcome of a branch instruction to be processed by the processing circuitry, based on branch prediction state information stored in one or more branch prediction structures;
a return-address-predicting call-return stack comprising at least one entry to store a return address pushed onto the return-address-predicting call-return stack in response to a corresponding procedure calling instruction, wherein the branch predictor is configured to predict a return address of a return instruction based on a return address popped from the return-address-predicting call-return stack; and
a link register, different from the return-address-predicting call-return stack, where the processing circuitry is configured to store an actual return address to the link register in response to execution of the procedure calling instruction, the actual return address identifying an instruction to be executed after returning from a procedure called by the procedure calling instruction; in which:

said one or more branch prediction structures include at least one call-return-stack-indexed branch prediction structure indexed based on an index value which depends on a portion of one or more entries of the return-address-predicting call-return stack;

wherein the branch predictor comprises a perceptron predictor for which:

the branch prediction structures comprise a plurality of weight tables to specify weight values;

the plurality of weight tables include at least:

a first weight table indexed based on a program counter;

a second weight table indexed based on a hash of the program counter with at least a portion of a global history value indicative of a history of taken or not taken outcomes for a plurality of previous branch instructions; and a third weight table indexed based on a hash of the program counter with said portion of one or more entries of the return-address-predicting call-return stack; and wherein the perceptron predictor is configured to predict a taken/not-taken outcome for the branch instruction based on addition of weight values from indexed entries of the first weight table, the second weight table, and the third weight table.

2. The apparatus according to claim 1, in which the return-address-predicting call-return stack comprises a last-in, first-out, data structure.

3. The apparatus according to claim 1, in which said at least one call-return-stack-indexed branch prediction structure is configured to store branch prediction state information for predicting an outcome of one or more types of branch instructions, said one or more types of branch instructions including at least one type of branch instruction other than said return instruction.

4. The apparatus according to claim 1, in which said portion of the call path tracking information comprises the return address at the top of the call-return stack.

5. The apparatus according to claim 1, in which when the call-return stack includes a plurality of active entries storing return addresses which are still to be popped from the call-return stack, said portion of the call path tracking information comprises the return addresses in at least two of the active entries.

6. The apparatus according to claim 1, in which said index value depends on a result of applying a hash function to at least a portion of one or more return addresses in one or more of said at least one entry of the call-return stack.

7. The apparatus according to claim 1, in which said index value depends on a function of said portion of the call path tracking information and at least one type of further information.

8. The apparatus according to claim 7, in which said at least one type of further information includes at least one of:
at least a portion of the global history value; and
at least a portion of a path value indicative of a history of branch target addresses determined for a plurality of previous branch instructions.

9. The apparatus according to claim 1, in which the return-address-predicting call return stack is configured to update said at least one entry depending on at least a portion of the return address associated with the procedure calling instruction and at least a portion of at least one context identifier indicative of an execution context in which the procedure calling instruction is executed.

10. An apparatus comprising:
means for performing data processing in response to instructions;
means for predicting an outcome of a branch instruction to be processed by the processing circuitry, based on branch prediction state information stored in one or more branch prediction structures;
a return-address-predicting call-return stack comprising at least one entry to store a return address pushed onto the return-address-predicting call-return stack in response to a corresponding procedure calling instruction, wherein the means for predicting an outcome of a branch instruction is configured to predict a return address of a return instruction based on a return address popped from the return-address-predicting call-return stack; and
means for storing in a link register, different from the return-address-predicting call-return stack, an actual return address in response to execution of the procedure calling instruction, the actual return address identifying an instruction to be executed after returning from a procedure called by the procedure calling instruction; in which:
said one or more branch prediction structures include at least one call-return-stack-indexed branch prediction structure indexed based on an index value which depends on a portion of one or more entries of the return-address-predicting call-return stack;
wherein the means for predicting comprises a perceptron predictor for which:
the branch prediction structures comprise a plurality of weight tables to specify weight values;
the plurality of weight tables include at least:
a first weight table indexed based on a program counter;
a second weight table indexed based on a hash of the program counter with at least a portion of a global history value indicative of a history of taken or not taken outcomes for a plurality of previous branch instructions; and
a third weight table indexed based on a hash of the program counter with said portion of one or more entries of the return-address-predicting call-return stack; and
wherein the perceptron predictor is configured to predict a taken/not-taken outcome for the branch instruction based on addition of weight values from indexed entries of the first weight table, the second weight table, and the third weight table.

11. A method comprising:
performing data processing in response to instructions;
predicting an outcome of a branch instruction to be processed by the processing circuitry, based on branch prediction state information stored in one or more branch prediction structures;
in response to a procedure calling instruction, pushing a return address associated with the procedure calling instruction to a return-address-predicting call-return stack comprising at least one entry;
predicting a return address of a return instruction based on a return address popped from the return-address-predicting call-return stack;
storing in a link register, different from the return-address-predicting call-return stack, an actual return address in response to execution of the procedure calling instruction, the actual return address identifying an instruction to be executed after returning from a procedure called by the procedure calling instruction;

said one or more branch prediction structures including at least one call-return-stack-indexed branch prediction structure which is indexed based on an index value which depends on a portion of one or more entries of the return-address-predicting call-return stack;

wherein the outcome of the branch instruction is predicted using a perceptron predictor for which:
  the branch prediction structures comprise a plurality of weight tables to specify weight values;
  the plurality of weight tables include at least:
    a first weight table indexed based on a program counter;
    a second weight table indexed based on a hash of the program counter with at least a portion of a global history value indicative of a history of taken or not taken outcomes for a plurality of previous branch instructions; and
    a third weight table indexed based on a hash of the program counter with said portion of one or more entries of the return-address-predicting call-return stack; and wherein the perceptron predictor predicts a taken/not-taken outcome for the branch instruction based on addition of weight values from indexed entries of the first weight table, the second weight table, and the third weight table.

\* \* \* \* \*